United States Patent [19]

Willwerth et al.

[11] 4,140,827
[45] Feb. 20, 1979

[54] IMITATION-LEATHER, BIAS-STRETCHING PROCESS

[75] Inventors: Charles M. Willwerth, Newburyport; John P. Silvia, Tewksbury, both of Mass.

[73] Assignee: Compo Industries Inc., Waltham, Mass.

[21] Appl. No.: 810,920

[22] Filed: Jun. 29, 1977

[51] Int. Cl.² .................... B29C 17/02; D06N 3/04
[52] U.S. Cl. .................... 428/151; 26/69 R; 28/163; 264/232; 264/284; 264/289; 264/340; 264/DIG. 73; 428/904; 428/910
[58] Field of Search ............... 264/289, 288, 285, 291, 264/292, 339, 2, 154, DIG. 47, 232, 340, 284, 293, DIG. 73; 428/151, 155, 904, 910; 156/61, 183, 229

[56] References Cited

U.S. PATENT DOCUMENTS

| | | | |
|---|---|---|---|
| 2,494,334 | 1/1950 | Dorst | 264/288 |
| 3,000,754 | 9/1961 | Zentmyer | 428/910 |
| 3,233,029 | 2/1966 | Rosmussen | 264/288 |
| 3,257,488 | 6/1966 | Rosmussen | 264/289 |
| 3,919,451 | 11/1975 | Lerg et al. | 428/904 |
| 4,002,792 | 1/1977 | Petersen et al. | 428/904 |
| 4,017,656 | 4/1977 | Lasman et al. | 428/904 |
| 4,052,236 | 10/1977 | Kapasi et al. | 428/151 |
| 4,053,669 | 10/1977 | Kapasi et al. | 428/904 |

*Primary Examiner*—James B. Lowe
*Attorney, Agent, or Firm*—Richard P. Crowley

[57] ABSTRACT

A diagonal bias-stretching device and a method of enhancing surface grain of imitation-leather material with such device, which device comprises a reciprocating roller moving between lateral positions on either side of a line of advance of an imitation-leather material, to provide for alternating diagonal stretching and relaxing of the material as it moves under tension in the line of advance.

20 Claims, 3 Drawing Figures

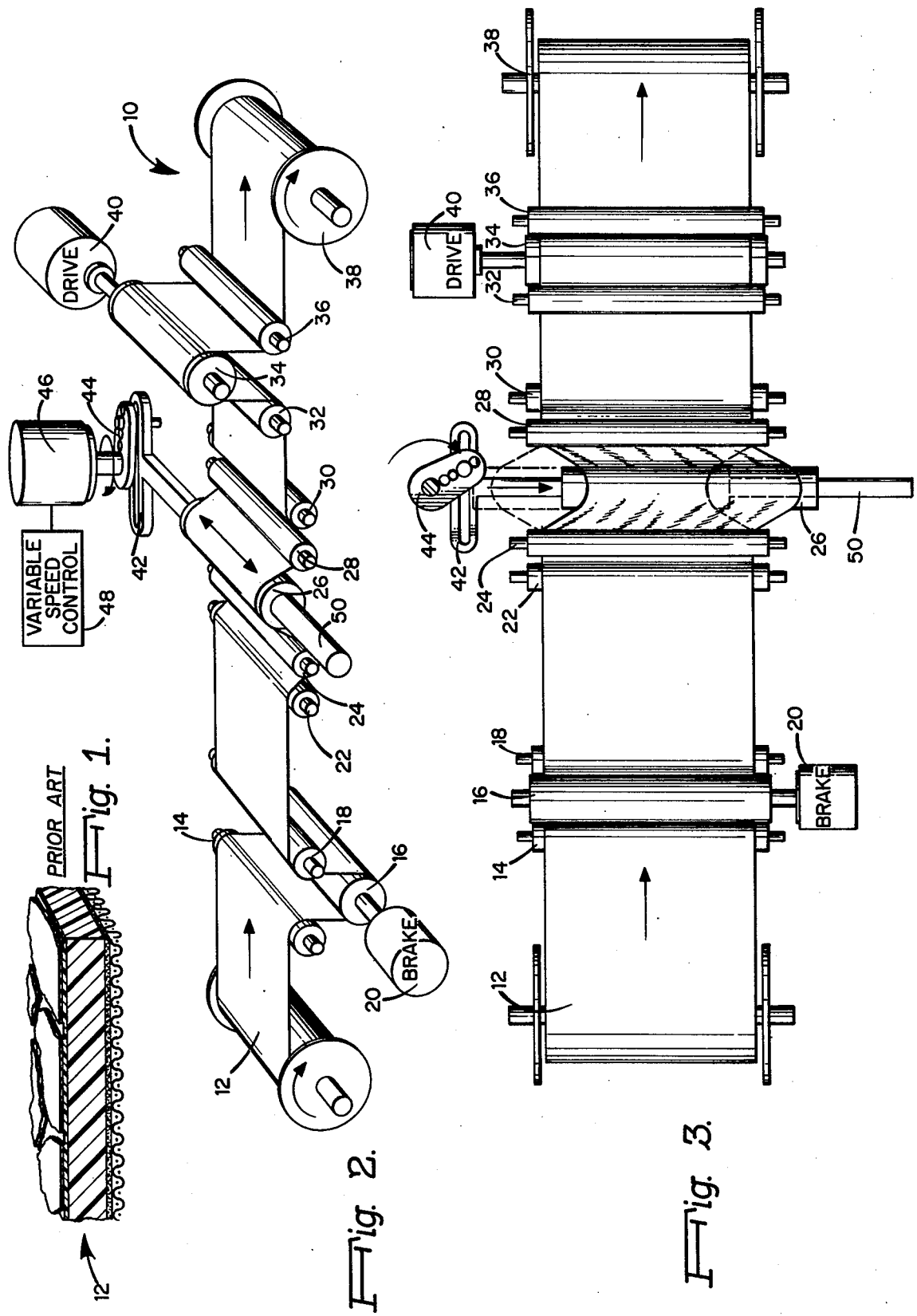

IMITATION-LEATHER, BIAS-STRETCHING PROCESS

BACKGROUND OF THE INVENTION

In the production of natural, leather-like or imitation or artificial leather sheet materials, it is most desirable that such materials have both the appearance and mechanical properties of natural leather. In particular, it is desirable that multi-layered polymeric imitation-leather materials have a break or cockle appearance or a grain-accentuation effect closely resembling that of natural leather. Natural leather often is characterized by appearance of many fine breaks or cracks from the surface thereof which provides a distinct appearance to the leather, and also provides for enhanced mechanical properties, such as better soft-hand properties.

Attempts have been made to provide a more natural leather-like look to imitation-leather materials through bending or crimping imitation-leather materials by various mechanical techniques, such as, for example, by passing the laminate material through a tumbling drum, over a series of breaker bars, or by subjecting the material, where it has a fabric base, to steam and moisture. Other techniques have involved the modification of the chemical properties of the particular polymers used in preparing the imitation-leather material. In some cases, both mechanical and chemical techniques have been employed in an attempt to have the imitation-leather material resemble an outward appearance of natural leather and the mechanical properties thereof.

In one method described in U.S. patent application Ser. No. 656,169, filed Feb. 9, 1976 (now U.S. Pat. No. 4,052,236, issued Oct. 4, 1977), hereby incorporated by reference in its entirety, a process of preparing a polymeric imitation-leather-type material, having an enhanced grain-like surface appearance, is described. In the described process, the laminate material, comprising a base fibrous layer having a continuous coating of a first polymer having a low modulus of elongation, and a second discontinuous coating of a second polymer having a high modulus of elongation, is prepared, which laminate material contains a three-dimensional surface-design effect thereon, typically representing a leather-grain effect, or may be of some other design as desired. The laminate material, which may contain a clear top layer for wear resistance or to enhance the grain, is then flexed to provide a sheet material with an accentuated design effect thereon. Flexing typically is accomplished by subjecting the base of the material to heat and moisture and alternately drying the material, and, thereafter, passing the material through a tumbling drum wherein the material is mechanically flexed, tumbled and crumpled. In this process, both the chemical formulation and the mechanical techniques are employed to obtain an enhanced design effect.

In the described process, the employment of a tumbling drum is not wholly satisfactory, nor is the employment solely of moisture or steam, since there is little, if any, direct control over the degrees of flexing or stretching. A tumbling drum occupies substantial space and consumes energy and often leads to production problems in the continuous feeding into and out of the drum of the laminate sheet material. In addition, there is a desire to control, in a more direct manner, the flexing process, and to provide for a more accentuated grain effect and better mechanical properties; for example, hand properties, in the multilayered laminate material.

SUMMARY OF THE INVENTION

Our invention is related to a method to stretch, in a controlled bias manner, a sheet material under tension, particularly a laminate imitation-leather material, to a bias-stretching apparatus for such material, and to the sheet material so treated. In particular, our invention concerns the controlled, rapid and multiple-lateral stretching and relaxing under tension of a laminate sheet material having a surface design thereon, to accentuate the surface-design effect, and to an apparatus for stretching and relaxing the laminate material by reciprocative, lateral, diagonal movement of the laminate material during longitudinal movement, and to the imitation-leather material so treated.

Our invention provides for the alternate and controlled stretching and relaxing under tension of a sheet material, such as an imitation grain-leather laminate material, in a diagonal biased direction. Such controlled stretching typically improves both the hand properties of the treated material and the surface-design appearance thereof. For example, in multilayered laminate products, wherein the surface contains a three-dimensional surface-design effect, our method and apparatus permit the design grain of the surface to become more accentuated. Where the laminate sheet comprises a cast, continuous, urethane polymer and a second discontinuous urethane polymer on a fabric base, the cast urethane polymer tends to take a certain set. Controlled stretching under tension tends to stretch the laminate in a controlled manner, and permits the discontinuous grain layer to take less of a set, and, therefore, to pop up and emphasize the grain.

In addition, subjecting a sheet laminate material to controlled biasing, stretching and relaxing softens the material and provides for better hand properties. Where a sheet laminate material contains a finished coating, such as a clear or translucent coating, like a hard urethane or vinyl-chloride resin, the laminate material may be controllably stretched, in order to provide fine breaks and minor shattering of the coating in and around the design effects, so as to provide a more natural, leather-like or aged surface appearance.

Our method comprises advancing continuously a sheet material, composed of a coated polymeric material on a base fabric, under tension in a longitudinal direction along a line of advance, such as in a line in a production or casting operation. The material is then alternately and rapidly stretched and relaxed by reciprocating lateral movement of the material between positions on either side of the line of advance, while the material is retained along a line generally normal to the line of advance and at a controlled, spaced distance from the reciprocating line. The reciprocating movement of the lateral material is accomplished at a controlled rate of frequency and at a controlled lateral or length stroke by controlling the degree of bias-stretching or the angle of stretching of the material as it moves longitudinally in the line of advance. Our method, particularly with three-dimensional, imitation-grain, laminate materials, provides for tiny breaks and stretching of the materials around the raised grain areas. The method may be employed to replace, or in addition with other chemical or mechanical actions, to effect the hand or the design accentuation of the material, such as tumbling, flexing, crimping, stretching, breaking or chemical or process treatments.

Our method may be employed in a wide variety of sheet materials where controlled stretching and relaxing of the sheet materials are desired. However, our method will be described in reference to imitation or natural leather-like materials, particularly multilayered laminate materials containing coated plastics, and more particularly wherein the laminate material comprises a fibrous base layer, such as a woven substrate, a first continuous polymer layer which may be a solid or foam layer, and at least a raised discontinuous polymer layer to provide a design effect. The design effect on the surface of the laminate may be provided by a variety of methods, such as embossing, casting and the like. The method may be employed as one of the techniques in a production line, which would include the casting of the laminate, the finish of the laminate, such as including a treatment of a topcoat, the tumbling or other treatment of the laminate, and then the controlled or bias-stretching of the laminate by our technique.

Our method has a softening effect on the underlying fabric and foam of such laminate layers, and may provide for shattering or crazing of any hard, wear-resistant topcoat which provides for a plurality of small, fine, natural breaks in and around the grain, and also tends to accentuate the individual discontinuous grain layer. The method is particularly valuable in that the angular degree of bias-stretching, tension of the web, and the rate of the stretched length can all be controlled, so as to obtain and control the desired effects on each particular sheet material so treated.

A suitable apparatus for carrying out the lateral stretching and relaxing under tension of a continuously moving laminate sheet material comprises means to advance continuously a sheet material longitudinally under tension from a source along a line of advance, such as in a production line; a reciprocating means, such as a roller, disposed in the line of advance of the sheet material and in nonsliding contact with one surface of the sheet material along a contact line which is generally normal to the axis of advance of the material; and first or second, and preferably both, retaining means defining first and second positions, such as rollers, disposed either before or after, or both, in the line of advance of the sheet material.

Preferably, one retaining roller or pair of nip rollers is disposed forward at a first position and the other roller or pair of nip rollers is disposed after the reciprocating roller second position in a controlled, spaced-apart, aligned relationship therewith. In the preferred embodiment, the sheet material extends from the nonsliding surface of the first and second rollers over or under the reciprocating roller. The first and second retaining rollers hold the sheet material as it moves continuously along a contact line on the rollers, which rollers are generally parallel to the reciprocating roller.

Means are employed to reciprocate the reciprocating roller in a direction generally normal to the line of advance of the material, and between positions from one to the other side of the line of advance of the material. The reciprocating thus is alternated at a controlled frequency or rate and at a controlled lateral or stroke length from one to the other side as the material is advanced longitudinally, while the first and second rollers contain the laminate material in position as it advances longitudinally. In this manner, rapidly alternating stretching and relaxing of the sheet material is accomplished very rapidly and efficiently in a diagonal or biased direction. Such rapid alternating motion causes diagonal stretching and relaxing, and softens the material to provide a better hand and accentuates grain, all of which contribute to making the material similar to natural leather.

In a preferred embodiment of our invention, employing a three-dimensional grain-effect, imitation-leather material, such as that material described in the patent application, supra, it is desirable to effect further flexing treatment of the material prior to subjecting the material to bias-stretching. For example, typically the material is first subjected to moisture and then tumbling in a tumbling drum (and, thereafter, a shattered-type, clear, hard, polymeric top coating is applied), and the coated material is passed through our biasing, diagonal-stretching apparatus wherein the topcoat is slightly shattered and the grain accentuated by relaxing the raised discontinuous polymeric layer.

In our method and apparatus, it is essential to maintain the sheet in the line of advance under suitable tension between the first retaining roller and the reciprocating roller and/or the second roller and reciprocating roller, or both. It is also necessary to control the distance between the reciprocating roller and the retaining roller; that is, the distance between the line of contact that the sheet material makes on the reciprocating roller and the generally parallel line of contact which the sheet material makes in contacting the first roller before the reciprocating roller, or the second roller after the reciprocating roller, or both. The distance may vary and need not be the same on either side of the reciprocating roller. If the distance between the first and second roller is too great, then the frequency or rate of reciprocation must be very high, and a much larger stroke is required in order to obtain any effective diagonal or biased action. If the distance between such lines of contact is too short, then the reciprocating action is not effective or too much stretching may occur. We have found that it is essential to maintain a controlled distance between the respective line of reciprocation and line of contact. Typically, the distance should be such as to provide for a biased or diagonal angle of stretching ranging from about 30 to 60 degrees; although, if desired, any biased angle can be employed. The controlled distance often ranges between the reciprocating roller and the forward or backward retaining roll, which provides tension between the roller and the reciprocating roller from as low as 2 inches to as high as 1 foot; for example, 3 to 8 inches. The linear control distance will often be related to the width of the sheet material being processed and to the degree of crazing and softness desired in the ultimate product. Of course, a series of reciprocating rollers, afore and aft nip rollers, or retaining rollers to maintain tension, may be used in series or in any combination, if desired.

Our invention will be described for the purpose of illustration only in connection with certain apparatus and laminate imitation-leather sheet materials. However, it is recognized and is within the spirit and scope of our invention that various changes and modifications may be made, both in our method and in our apparatus, without departing from the spirit and scope of our invention and contribution to the art.

BRIEF DESCRIPTION OF THE DRAWINGS

FIG. 1 is a partial sectional perspective view of prior-art imitation-leather laminate sheet materials of the type useful in our process and apparatus;

FIG. 2 is a perspective illustrative view of a diagonal, bias-stretching apparatus of our invention employing the laminate material of FIG. 1; and FIG. 3 is a top plan view of the diagonal, bias-stretching apparatus of FIG. 2, illustrating in particular the oscillating positions of the sheet material during processing.

DESCRIPTION OF THE EMBODIMENTS

FIG. 1 illustrates a particular prior-art sheet laminate material; for exampe, of the type described in the patent application, supra, and which sheet laminate material comprises a woven, stretchable, fabric base; a continuous layer either of a solid urethane or a foamed urethane of vinyl chloride; and a discontinuous layer of a urethane or vinyl-chloride polymer cast on the solid layer to define a three-dimensional, imitation-grain-leather effect on the surface of the sheet laminate. In the most preferred embodiment, the sheet material is composed of first and second polymers which have a difference in the modulus of elongation at 100% psi of at least about 800 psi, and wherein the discontinuous layer has a modulus ranging from about 2,000 to 8,000 psi, and typically 4,000 to 6,000 psi. Of course, if desired, other solid or foam continuous layers may be employed to prepare a multilayered laminate. The prior-art material shown has a particular cast or set of the foam or solid polymer in the skin layers, and, after diagonal or bias-stretching and relaxing, the material considerably reduces the set of the respective layers and accentuates the grain effect of the discontinuous hard polymer on the surface. Where a thin, clear, hard, polymeric topcoat is employed, such material is often crazed or cracked, particularly in the valley areas of the grain accentuation, to provide many fine and multiple cracks to simulate natural leather.

Referring particularly to FIGS. 2 and 3, there is shown an apparatus 10 wherein a roll 12 of prior-art material, as shown in FIG. 1, taken from a tumbling drum and after top-coating, is unwound with the top grain surface facing upwardly through support rolls 14 and 18 and about a hold-back roll 16 having an adjustable braking means 20. The material 12 passes through a pair of parallel nip rollers 22 and 24 positioned about 4 to 6 inches from a reciprocating or oscillating roller 26 on an axis 50, and then through an additional pair of nip rollers 28 and 30 which are the same or may be a different distance from the previous nip rollers 22 and 24. The sheet material is then passed over rollers 32 and 36 over drive roller 34 containing a drive motor 40, and, thereafter, wound into a roll 38 from whence the material may be subsequently treated or the material shipped for use in the manufacture of shoes, handbags, belts, clothing and other like uses.

The reciprocating roller 26 is driven in a parallel reciprocating manner to nip rollers 22 and 24 and 28 and 30 through an extension of the axis 50 in a slotted bar 42 through an eccentric rod 44 secured to a driving motor 46, whereby the reciprocating roller 26 is rapidly oscillated between lateral positions on either side of the line of advance of the material. As described, the length of the stroke of the oscillation typically would be the same as the length between the line of contact between the reciprocating roller and the materials leaving the nip roller 24 or 28. For example, if the distance between the line of contact and the reciprocating roller and the nip rollers 24 and 28 is 4 inches, the length of the stroke would be 4 inches, which would provide a 45-degree bias- or diagonal stretching of the material. In addition, a motor-variable-speed control 48 is employed on the motor, so as to govern the frequency or rate of oscillation of the roller 26.

In operation, the sheet material 12 is wound off onto the roll under enough tension to insure an adequate roll wrap at hold-back roll 16. Hold-back roll 16 is braked by an adjustable brake to control the tension through the nip rollers 22 and 24. A series of pairs of nip rollers, like 22 and 24 forward and 28 and 30 on the opposite side, are employed to prevent the sheet product, as it moves over such rollers in the line of advance, from sliding back and forth during the oscillatory motion of roller 26. Thus, the nip rollers insure that the bias-stretching occurs only along and at the tangent line on the line of contact of the material from nip rollers 22 and 24 and 28 and 30 through the reciprocating roller 26. As particularly illustrated in FIG. 3, in the embodiment described, the bias-stretching is at an angle of about 45 degrees. The tension employed between the nip rollers and the reciprocating roller may be adjusted, but is typically made drum-tight to the hand. The reciprocating roller, whose frequency is controlled by the control 48 of the motor 46 and whose length of stroke is controlled by the particular setting of traverse rod 44 at the end of the slotted rod 42, moves back and forth at a controlled rate and a variably controlled stroke in a direction perpendicular to the line of advance or flow of the web material.

By such operation, the reciprocating roller stretches the material when it is in its farthest lateral position on either side of the line of advance, and relaxes the material (to the line tension) when it is in its normal position; that is, zero angular position in line of advance, and which position is without any bias, and stretches the material when it moves to the opposite side of the line of advance. This operation provides stretching and relaxing of the laminate sheet material in both bias directions. The drive roller 34 drives the material and provides tension from the reciprocating roller 26 through the nip rollers 28 and 30 up to the drive roller 34, and also controls the line-of-advance speed of the sheet material in the apparatus.

In operation, our apparatus and process provide for high production speeds; for example, over 200 yards per hour of sheet material, such as, for example, 250 to 500 yards per hour, while bias-stretching the material. It is preferred that the reciprocating roller and the nip rollers 22 and 24 and 28 and 30 contain a nonsliding surface or coating, such as to be elastomer-coated, so as to prevent the material from sliding during the bias-stretching and to retain the material in position. The rollers need not be heated, but optionally may be heated if desired. Further, the sheet material may be treated with steam or moisture or materials or vapors to enhance further stretching and relaxing and grain-accentuating effects. For example, the rollers may be perforated or steam-saturated rollers to direct steam and moisture into the lower base or woven base fabric of the sheet material, such as, for example, rollers 14 and 18. In operation, it is important to have the sheet material with the face up, or the surface layer in a position such that the material passes over the reciprocating roller or under the reciprocating roller, with the base of the material in contact with the surface of the reciprocating roller, so as to avoid abrasion or damage to the face surface of the sheet material by the reciprocating action of the roller. Of course, if the material has no face surface of is such abrasive action is not detrimental, either side of the material may be employed in contact with the reciprocating roller.

What we claim is:

1. A method of treating a sheet material comprising a base layer having a polymer layer secured thereto with a surface design thereon, which method comprises:
    (a) advancing continuously the sheet material in a longitudinal direction along a line of advance between a first position and a second position while maintaining the sheet material under tension between said positions; and
    (b) subjecting the sheet material while between said positions to rapid reciprocating lateral movement to a predetermined lateral distance and at a predetermined frequency, first to one side and then through the center of the line of advance to the other side while the sheet material is maintained under tension between said positions, such that the sheet material is diagonally biased-stretched, thereby improving the property of the treated sheet material by such bias-stretching action.

2. The method of claim 1 wherein the laminate sheet material comprises a fibrous, woven, base layer, a continuous polymeric layer coated on the base layer, and a discontinuous polymeric layer providing a three-dimensional surface-design effect on the continuous polymeric layer, the continuous and discontinuous polymeric layers having a difference of at least 800 psi in the modulus of elongation at 100% psi.

3. The method of claim 1 which includes tumbling the sheet material to provide multiple flexing thereof prior to diagonal and bias-stretching of the material.

4. The method of claim 1 which includes a fracturable top layer on the surface-design effect, and which top layer, on bias-stretching, is crazed to provide a leather-like imitation surface.

5. The method of claim 1 wherein reciprocating lateral movement of the laminate material is accomplished by a reciprocating roller placed in contact with the base surface of the laminate sheet material.

6. The method of claim 1 wherein the reciprocating lateral movement is at a frequency of from about 50 to 250 cycles per minute.

7. The method of claim 1 wherein the reciprocating lateral movement of the laminate material provides for stretching at an angle of between about 30 and 60 degrees.

8. The method of claim 1 wherein the distance between the first and second positions and the reciprocating movement varies from about 2 to 12 inches in length along the line of advance.

9. The bias-stretched sheet material produced by the process of claim 1.

10. The bias-stretched sheet material produced by the process of claim 3.

11. The method of claim 1 which includes controlling the tension of the sheet material as it moves along the line of advance.

12. The method of claim 1 wherein the sheet material comprises a multilayered laminate sheet material having a fibrous base layer and at least two coated polymer layers.

13. The method of claim 1 wherein the sheet material comprises a base fabric layer having first and second polymer layers, which polymer layers have a difference in modulus of elongation at 100% psi of at least about 800 psi and comprising a continuous and a discontinuous layer, the discontinuous layer having a modulus of elongation ranging from about 2000 to 8000 psi, the sheet material containing a top, clear, wear-resistant layer subject to crazing or fracture on bias-stretching of the sheet material.

14. The method of claim 1 which includes
    (a) maintaining the sheet material under tension between a first pair of nip rollers as a first position and a second pair of nip rollers as a second position; and
    (b) reciprocating the sheet material by the rapid movement substantially perpendicular to the line of advance of a reciprocating roller placed in nonsliding contact with the base of the sheet material.

15. The method of claim 1 which includes subjecting the sheet material to rapid reciprocating movement by means of a reciprocating roller placed in nonsliding contact with the base of the sheet material.

16. The method of claim 14 which includes employing an elastomeric-coated reciprocating roller positioned substantially equidistant between the first and second positions.

17. The method of claim 1 which includes subjecting the sheet material to reciprocating movement substantially perpendicular to the line of advance to provide for a diagonally bias-stretching of the sheet material at an angle of about 45° from the line of advance.

18. A method of treating a laminate sheet material, which laminate sheet material comprises a fibrous base layer, a continuous polymeric layer and a discontinuous polymeric layer defining a surface-design effect, which method comprises:
    (a) advancing the sheet material in a longitudinal direction along a line of advance through a first pair of nip rollers as a first position and a second pair of nip rollers as a second position, while maintaining the sheet material under controlled tension between said position;
    (b) subjecting the sheet material while between said positions to rapid, reciprocating lateral movement by a reciprocating roller placed in nonsliding contact with the base surface of the sheet material and positioned substantially equidistant in the line of advance between the first and second positions, the reciprocating roller moving substantially perpendicular to the line of advance to provide for lateral movement of the sheet material at an angle of about thirty (30) to sixty (60) degrees from the line of advance, the reciprocating roller moving first to one side and then through the center of the line of advance to the other side of the sheet material under tension such that the sheet material is diagonally bias-stretched, thereby improving the hand properties and surface design of the treated sheet by such bias-stretching.

19. The method of claim 18 wherein the sheet material includes a top layer subject to crazing on bias-stretching of the sheet material.

20. The bias-stretched sheet material produced by the process of claim 19.

* * * * *